US006019398A

United States Patent [19]
Powers

[11] Patent Number: 6,019,398
[45] Date of Patent: Feb. 1, 2000

[54] TAPPING SLEEVE WITH A GLAND

[75] Inventor: Edward J. Powers, Aurora, Ill.

[73] Assignee: Pipeline Accessory Marketing, Ltd., Aurora, Ill.

[21] Appl. No.: 09/157,201

[22] Filed: Sep. 18, 1998

[51] Int. Cl.[7] .......... F16L 55/00

[52] U.S. Cl. .......... 285/148.19; 285/197; 285/337; 285/368; 285/416

[58] Field of Search .......... 285/197, 368, 285/416, 337, 148.19; 137/317, 320, 318, 322

[56] References Cited

U.S. PATENT DOCUMENTS

| | | | |
|---|---|---|---|
| 3,415,547 | 12/1968 | Yano | 285/337 |
| 3,433,509 | 3/1969 | Jeffery et al. | 285/416 X |
| 3,720,428 | 3/1973 | Zastawny | 285/368 |
| 4,610,471 | 9/1986 | Halen et al. | 285/337 |
| 4,637,641 | 1/1987 | Kennedy | 285/337 |
| 4,741,356 | 5/1988 | Letzo et al. | 137/272 |
| 5,052,431 | 10/1991 | Jiles | 285/197 X |
| 5,174,615 | 12/1992 | Foster et al. | 285/334.2 |
| 5,374,087 | 12/1994 | Powers | 285/197 |

FOREIGN PATENT DOCUMENTS

| | | | |
|---|---|---|---|
| 2451759 | 5/1976 | Germany | 285/368 |

OTHER PUBLICATIONS

Pipeline Products Corporation, Wichita Falls, Texas—Long Body Cutting–In Sleeve.

Clow Pipe Economy Book, pp. 66 and 93, Published 1982.

*Primary Examiner*—Dave W. Arola
*Attorney, Agent, or Firm*—Dorn, McEachran, Jambor & Keating

[57] ABSTRACT

A tapping sleeve assembly for direct connection to a gate valve. The assembly includes a tapping sleeve attached to a main pipe. An outlet conduit formed integrally with and extend outwardly from the tapping sleeve terminates in a distal end outlet. A retaining ring is attached to the outer surface of the outlet conduit and is located between the tapping sleeve and the distal end outlet. Opposed, longitudinally facing annular surfaces are formed on the retaining ring with one of the annular surfaces facing the tapping sleeve and the other facing the distal end outlet. The annular surface facing the tapping sleeve is inclined. A gland telescopes over the outlet conduit. The gland has a collar with an annular surface engaged with an annular surface of the retaining ring. A gate valve has a socket facing the outlet conduit, a gasket is positioned in the socket and a mechanical joint flange surrounds the socket. Bolts and nuts attach the gland to the mechanical joint flange of the gate valve.

4 Claims, 1 Drawing Sheet

TAPPING SLEEVE WITH A GLAND

BACKGROUND AND SUMMARY OF THE INVENTION

Tapping sleeves are conventionally used to connect a branch pipe to a main pipe in a fluid supply system such as a waterworks, without shutting down the main pipe. This procedure is usually referred to as making a pressure tap because the fluid pressure is maintained in the main pipe while a connection is made to a branch pipe. The connection is made by cutting a hole in the pressurized main pipe using a power or manual tapping machine. The tapping machine extends into a branch outlet pipe on the tapping sleeve through a gate valve which is closed after a cutaway portion of the main pipe is removed by the tapping machine through the branch outlet pipe and the gate valve. The gate valve remains to control fluid flow from the main pipe through the later installed distribution piping supplied by the branch outlet pipe.

A specialized type of gate valve is presently used in making a pressure tap. This specialized tapping gate valve is equipped with a bolted flange having either a raised face or recessed face on its branch outlet pipe side and a mechanical joint on its tapping machine receiving side. The raised face or recessed face flange of the gate valve is bolted to a raised face or recessed face flange provided on the outlet end of the branch outlet pipe of the tapping sleeve. The raised or recessed faces are provided to insure vertical alignment of the gate valve with the outlet pipe of the tapping sleeves. A bolted flange joint has been considered necessary for use with a tapping sleeve so that the tapping cutter accurately cuts the opening in the main pipe and also withstands the large torque and axial thrust applied to the connection by the tapping machine.

The use of a bolted flange on the branch outlet pipe requires contractors to obtain and inventory specialized tapping gate valves which are equipped with a bolted raised face or recessed face flange on one side and a mechanical joint on the other side of the gate valve. Additionally, the time required to make a pressure tap using these specialized tapping gate valves is substantial because of the difficulty in connecting bolted flanges compared to the time required to complete mechanical joint connections.

Accordingly, it is an object of this invention to provide a tapping sleeve assembly for making a pressure tap having a branch outlet pipe with a retaining ring adapted for use in a standard mechanical joint gate valve for connection to the tapping sleeve outlet pipe, thereby eliminating the need for use of a specialized raised face or recessed face tapping valve. Retaining rings have previously been used on tees, elbows and extension pipe but have never been provided with tapping sleeves.

Another object of this invention is a mechanical joint branch outlet pipe that is adaptable to both "bolt on" and "weld on" tapping sleeves or partial tapping sleeves.

Still another object of this invention is a tapping sleeve branch outlet pipe having a retaining ring with an inclined annular surface complementary to the collar of the mechanical joint.

In its broadest aspect, this invention provides a pressure tap connection that incorporates all the advantages of a mechanical joint while not limiting the use of modified joint accessories.

Other objects of this invention will be found in the following specification, claims and drawings.

BRIEF DESCRIPTION OF THE DRAWINGS

The invention is illustrated more or less diagrammatically in the following drawings wherein.

DESCRIPTION OF THE PREFERRED EMBODIMENT

Figure 2:
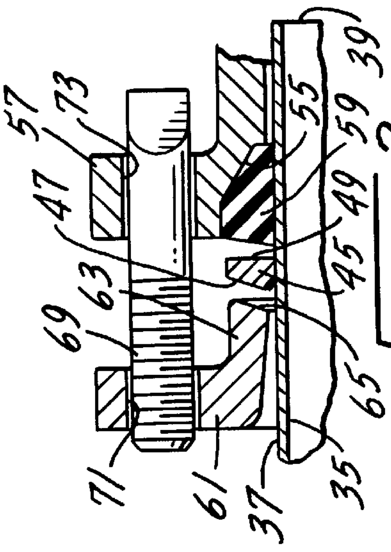
FIG. 2 is an enlarged view of a portion of a standard mechanical joint gate valve joint shown in an assembled but not tightened condition.
Figure 1:
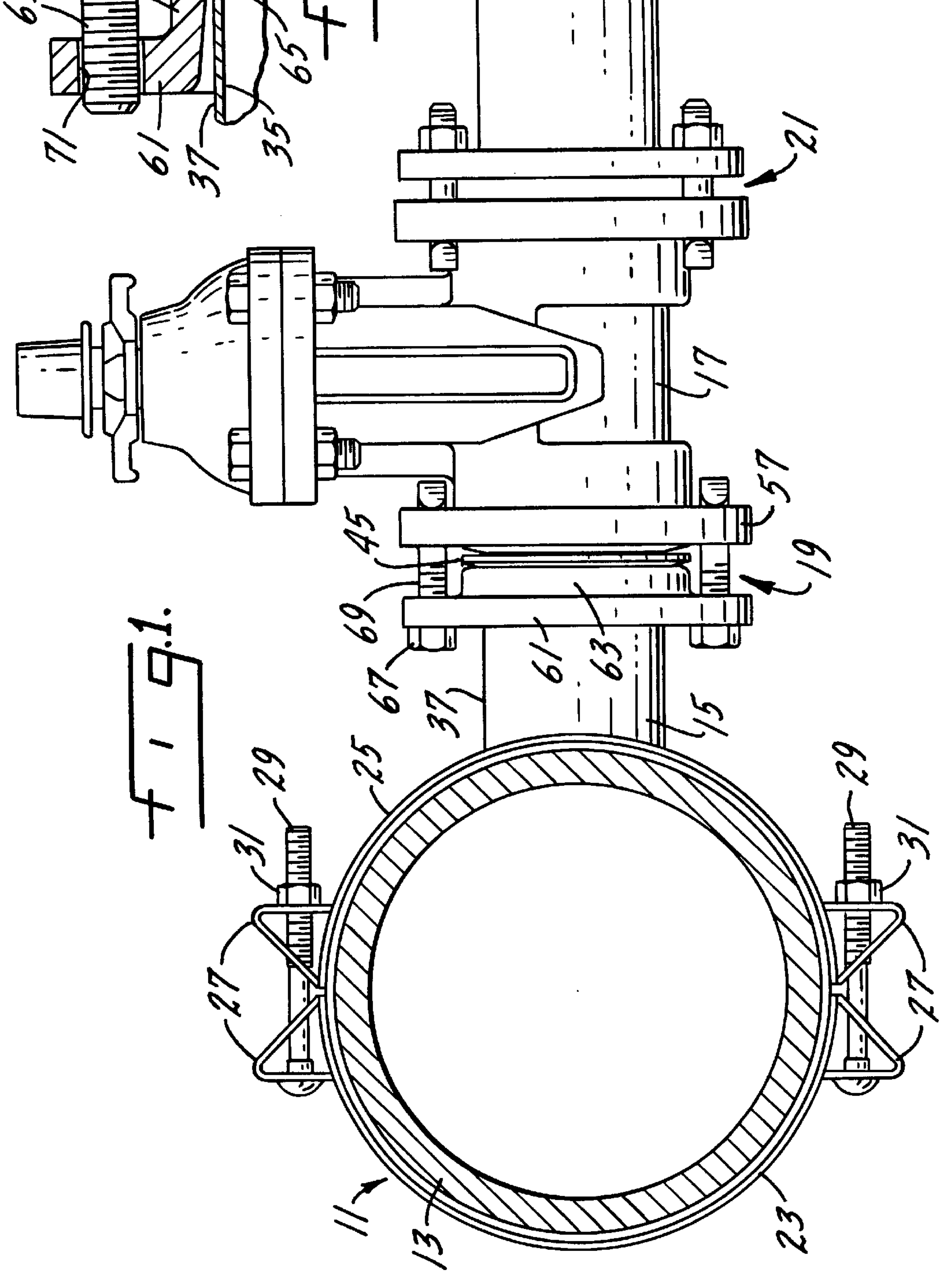
FIG. 1 is an elevational view showing the tapping sleeve of this invention connected to a main pipe of a fluid supply system and a standard mechanical joint gate valve with the connection to the tapping sleeve only partially tightened.

As shown in the drawings, the preferred embodiment of the invention is a tapping sleeve 11 which surrounds a main fluid supply pipe 13. The tapping sleeve has a branch outlet pipe 15 which connects to a gate valve 17 having mechanical joint end connections 19 and 21 on opposite sides thereof. The mechanical joint 21 connects the gate valve to an outlet distribution pipe 22.

The tapping sleeve 11 shown herein is formed of one or more semi-cylindrical sections 23 and 25. However, smaller diameter tapping sleeves may have a single longitudinal split cylindrical section. The cylindrical sections or section are equipped with bolt lugs 27. Holes are provided through the bolt lugs but are not shown in the drawings. Bolts 29 pass through the aligned holes in the bolt lugs, through washers, also not shown, and through nuts 31 threaded on the bolts 29 to secure the semicircular sections 23 and 25 in water-tight contact with the main pipe 13. A tapping sleeve of this type is shown in my U.S. Pat. No. 5,374,087, issued Dec. 20, 1994. Other bolt lug designs for tapping sleeves have bolts welded to the lugs which bolts pass through two aligned plate members on the opposing lug. The gate valve 17 of this invention may also be used with "weld on" branch outlet pipes.

The branch outlet pipe 15 has a wall 35 with an outer surface 37. The wall 35 terminates in an outlet opening 39 which seats in the mechanical joint 19 of the gate valve 17. A retaining ring 45 is fastened in a conventional manner such as by welding to the outer surface 37 of the branch outlet pipe wall 35 as can best be seen in FIG. 2 of the drawings.

The retaining ring 45 is formed with an inclined annular surface 47 facing the tapping sleeve 11 and a normally extending annular surface 49 on the opposite side thereof facing the outlet opening 39 of the branch outlet pipe 15. The retaining ring 45 is positioned on the branch outlet pipe 15 at a location between the tapping sleeve 11 and the outlet opening 39. The branch outlet pipe wall 35 extends into a socket 55 formed as part of the mechanical joint 19 of the gate valve 17. A mechanical joint flange 57 surrounds the mechanical joint socket and a mechanical joint gasket 59 fits into the socket 55 on the exterior of the wall 35 of the branch outlet pipe 15 as is most clearly shown in FIG. 2 of the drawings. A mechanical joint gland 61 telescopes over the outer surface 37 of the branch outlet pipe 15. The gland 61 is equipped with a collar 63 having a longitudinally facing inclined annular surface 65. The inclined annular surface 65 engages the inclined annular surface 47 of the retaining ring 45 in a complementary manner when the mechanical joint 19 is securely tightened. The tightening of the mechanical joint is accomplished by nuts 67 which tightened over T-bolts 69 which extend through aligned openings 71 and 73 respectively in the gland collar 63 and the mechanical joint flange 57. Tightening of the nuts 67 on the T-bolts 69 brings the gland collar retaining ring 45 and mechanical joint gasket 59 together in a water-tight sealing relationship.

Although the mechanical joint gland 61 is shown as a one piece gland it should be understood and appreciated that a split gland may also be used. Additionally, although a standard mechanical joint gland 61 has been shown and described as the preferred embodiment of the invention, it should also be understood and appreciated that this gland may be replaced with other glands such as a ring gland as long as the replacement gland is equipped with an annular surface such as surface 65. Further, the annular surface 65 or its equivalent need not be inclined to the normal unless the annular surface 47 of the retaining ring 45 is also so inclined in a complementary relationship. Also, other changes to the mechanical parts of the tapping sleeve assembly may be made in accordance with the knowledge of one skilled in the art without departing from the novel aspects of this invention.

I claim:

1. A tapping sleeve assembly for direct connection to a gate valve, said assembly including:

a tapping sleeve attached to a main pipe, an outlet conduit having an outer surface, said outlet conduit formed integrally with and extending outwardly from said tapping sleeve, said outlet conduit terminating in an outlet at its distal end, a retaining ring attached to said outer surface of said outlet conduit at a location between said tapping sleeve and said distal end outlet, said retaining ring having opposed, longitudinally facing annular surfaces with one of said annular surfaces facing said tapping sleeve and another of said annular surfaces facing said distal end outlet, a gland telescoped over said outer surface of said outlet conduit, said gland having a longitudinally facing annular surface engaged with said annular surface of said retaining ring facing said tapping sleeve, a gate valve having a mechanical joint socket receiving said outlet conduit, a seal in said socket surrounding said outlet conduit and a mechanical joint flange surrounding said socket, and bolts attaching said gland to said mechanical joint flange of said gate valve for urging said retaining ring into engagement with said seal to thereby compress said seal into sealing engagement with said outlet conduit and said gate valve.

2. The tapping sleeve assembly of claim 1 in which said longitudinally facing annular surface of said retaining ring facing said tapping sleeve is inclined to the normal and said longitudinally facing annular surface of said gland is inclined in a complementary manner.

3. The tapping sleeve assembly of claim 1 in which said gland is a mechanical joint gland.

4. The tapping sleeve of claim 3 in which said mechanical joint gland has a collar and said longitudinally facing annular surface of said gland is formed on said collar.

* * * * *